(12) United States Patent
Morris et al.

(10) Patent No.: US 8,151,714 B2
(45) Date of Patent: Apr. 10, 2012

(54) CONTAINER SUPPORT FOR FREIGHT WAGON

(75) Inventors: Philip Edward Morris, Hamilton (AU); Michael James Boyd, Charlestown (AU)

(73) Assignee: Bradken Resources Pty Limited, New South Wales (AU)

( * ) Notice: Subject to any disclaimer, the term of this patent is extended or adjusted under 35 U.S.C. 154(b) by 0 days.

(21) Appl. No.: 12/738,250

(22) PCT Filed: Oct. 16, 2008

(86) PCT No.: PCT/AU2008/001534
§ 371 (c)(1),
(2), (4) Date: Apr. 15, 2010

(87) PCT Pub. No.: WO2009/049369
PCT Pub. Date: Apr. 23, 2009

(65) Prior Publication Data
US 2010/0229755 A1 Sep. 16, 2010

(30) Foreign Application Priority Data

Oct. 17, 2007 (AU) ................................ 2007905693

(51) Int. Cl.
*B61D 3/00* (2006.01)
(52) U.S. Cl. .......................... 105/355; 410/94; 105/404
(58) Field of Classification Search .................. 105/355, 105/404; 410/94
See application file for complete search history.

(56) References Cited

U.S. PATENT DOCUMENTS

| | | | | |
|---|---|---|---|---|
| 4,754,709 A | * | 7/1988 | Gramse et al. | 105/355 |
| 5,000,633 A | * | 3/1991 | Kowalik et al. | 410/67 |
| 5,017,066 A | * | 5/1991 | Tylisz et al. | 410/121 |
| 5,106,247 A | * | 4/1992 | Hove et al. | 410/73 |
| 5,308,202 A | * | 5/1994 | Tatina | 410/94 |
| 5,375,534 A | * | 12/1994 | Adams | 105/372 |
| 5,379,702 A | * | 1/1995 | Saxton et al. | 105/355 |
| 5,398,956 A | * | 3/1995 | Yurgevich | 280/441.2 |
| 5,520,489 A | * | 5/1996 | Butcher et al. | 410/94 |
| 5,749,686 A | * | 5/1998 | Butcher et al. | 410/94 |
| 5,957,640 A | * | 9/1999 | Schmieke et al. | 410/80 |
| 7,811,036 B2 | * | 10/2010 | Armour | 410/107 |
| 2010/0229755 A1 | * | 9/2010 | Morris et al. | 105/355 |

OTHER PUBLICATIONS

International Search Report PCT/AU2008/001534 dated Jan. 6, 2009.

* cited by examiner

*Primary Examiner* — S. Joseph Morano
*Assistant Examiner* — Jason C Smith
(74) *Attorney, Agent, or Firm* — Stephen A. Bent; Foley & Lardner LLP

(57) ABSTRACT

A shipping container support mechanism for a rail freight wagon is adjustable between a retracted position in which a container can be supported in a well of the wagon between elevated end platforms which extend over wheels and bogies. In the deployed, extended position, the mechanism supports an end region of a container, the opposite end of which can be supported on another such mechanism or an end platform. The support mechanism is mountable in the side wall of the wagon and has a pivotal support arm which can move from a stowed position in the wagon frame to a horizontally extended position.

17 Claims, 3 Drawing Sheets

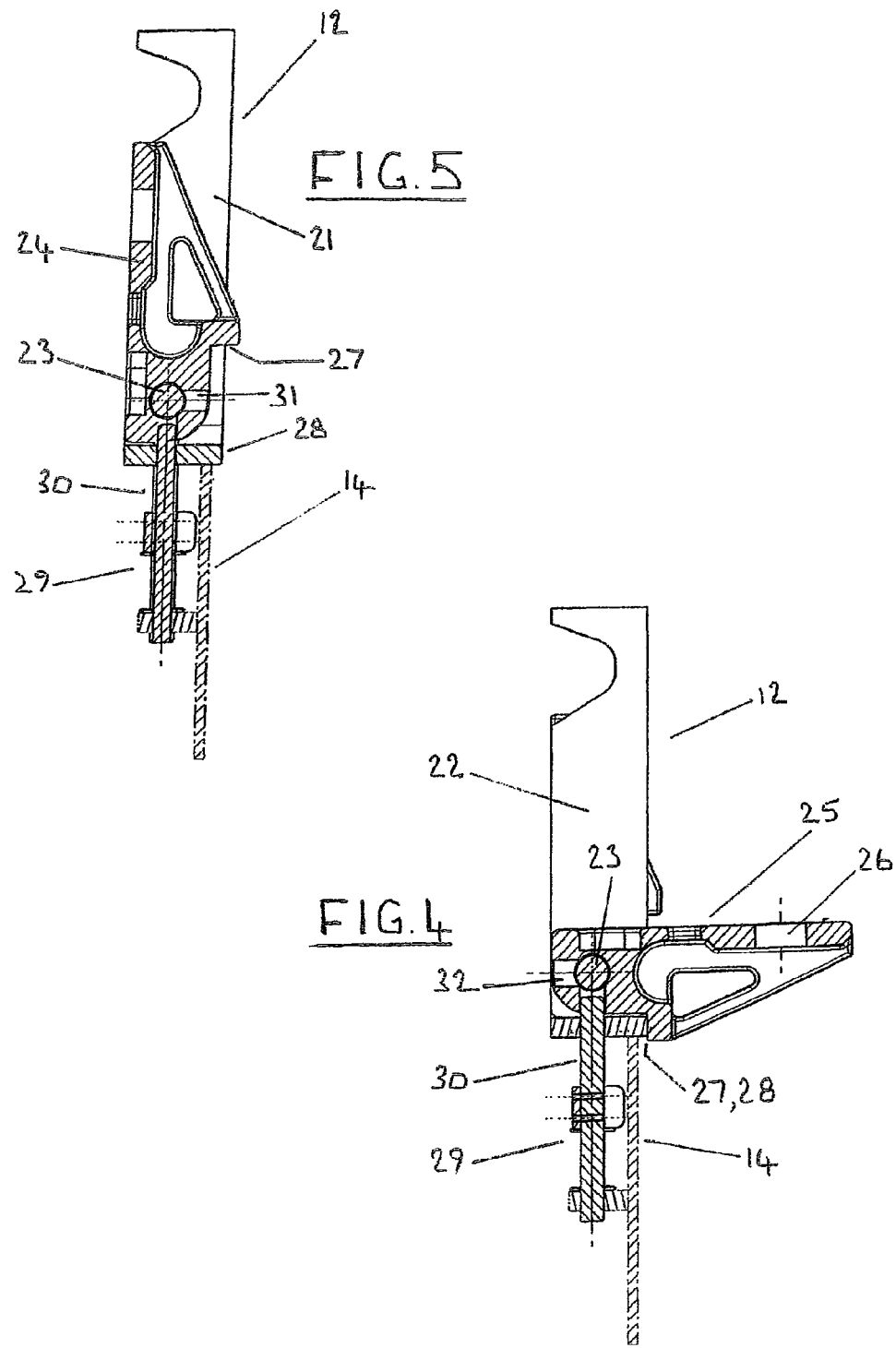

CONTAINER SUPPORT FOR FREIGHT WAGON

FIELD OF THE INVENTION

This invention relates to a container support mechanism that is suitable for use in a railway freight wagon and to a railway freight wagon when fitted with a plurality of the support mechanisms.

BACKGROUND OF THE INVENTION

A railway freight wagon that is employed for transporting a shipping container conventionally is constructed to accommodate at least one container wholly within a well of the wagon. Also, such a wagon typically is constructed with its opposite ends formed with raised platforms below which wheel assemblies are located. In order that an extended container or a plurality of shorter containers may be accommodated within the overall length of the wagon, including in the portions of the length that are occupied by the end platforms, retractable support mechanisms are provided within opposite side walls of the wagon for supporting the container(s) at an elevated position (i.e., at the level of the end platforms) within the wagon well. The support mechanisms are positioned at spaced intervals along the length of the side walls of the wagon and they are arranged to be retracted into the side walls of the wagon to facilitate flexible use of the wagon. Thus, the support mechanisms when retracted permit the nesting of a container wholly within the wagon well and when extended permit accommodation of one or more containers at the level of the end platforms.

Each support mechanism conventionally comprises a support arm that is mounted to a vertically extending axle for swinging movement horizontally into and out from the side wall of the wagon. Having regard to the loads that typically are to be carried by the support mechanism and bending moments imposed on the vertically extending axle, the support mechanism must be constructed in a size that occupies a large stowage space (this being a problem when the overall width of a wagon is critical). Horizontal swinging of the support arm into and out from a container supporting position has been found to be inconvenient.

SUMMARY OF THE PRESENT INVENTION

Broadly defined, the present invention provides a support mechanism for mounting in a side wall of a railway freight wagon and for supporting a shipping container on the wagon when the support mechanism is deployed for use. The support structure has a frame structure, arranged to be mounted in a side wall of the wagon, and at least one support arm pivotally mounted on the frame structure for movement about a substantially horizontal axis, the support arm being arranged to pivot between a first position in which it is stowed at least in part within the frame structure and a second position in which it extends away from the frame structure in a substantially horizontal direction so it is deployed to support a shipping container.

The frame structure may be one having spaced sidewalls between which an axle extends at a lower region and the support arm is pivotally mounted on the axle and is disposed between the sidewalls for pivotal movement. The structure can be such that simple manual action is all that is required to move the support arm between its positions.

The support arm when located in the first position may optionally be stowed in any way that that permits the positioning of a container within the wagon at a level below that of the support mechanism, without interference from the support arm. However, the support arm desirably is configured and/or arranged to extend in a generally vertical direction and to locate substantially entirely within the frame structure when stowed in the first position.

Various structural arrangements may optionally be provided for determining the limit of pivotal movement of the support arm when it is in the second position, but in one embodiment of the invention the support arm is formed integrally with an abutment face that is arranged and positioned to engage with a portion of the frame structure when the support arm is located in the second position. Thus, engagement between the abutment face of the support arm and the frame structure provides for referral from the support arm to the frame structure and thence to the wall of the wagon of a force exerted on the support arm by a container carried by the support arm.

A locking mechanism may optionally be employed to lock the support arm in the first and/or second position, to prevent inadvertent pivotal movement of the support arm when it is not supporting a container within a wagon. In one embodiment of the invention such locking mechanism comprises a retractable latching mechanism that is employed to latch the support arm in the first position and, desirably, to latch the support arm when in each of the first and the second positions. Such latching mechanism may comprise a spring-loaded plunger that is engaged in respective ones of two recesses in the support arm when the support arm is alternatively in the first and second positions.

Two of the support mechanisms as above described and defined may be positioned side-by-side within a single frame structure with a dividing frame member located between the two mechanisms. Such support mechanism is hereinafter referred to as a dual support mechanism.

The present invention further subsists in a railway freight wagon which is arranged to carry at least one shipping container and a plurality of support mechanisms located within side walls of the wagon. Each support mechanism comprises a frame structure located within a side wall portion of the wagon, and at least one support arm pivotally mounted to in the frame structure. The support arm is pivotal between a first position in which it is stowed at least in part within the frame structure and a second position in which it extends outwardly or away from the frame structure in a substantially horizontal direction for engagement by a container when positioned within the wagon, whereby the support arm contributes to supporting the container.

The invention will be more fully understood from the following description of an illustrative embodiment of a support mechanism and a freight wagon in which a plurality of the support mechanisms is located. The description is provided with reference to the accompanying drawings.

BRIEF DESCRIPTION OF THE DRAWINGS

In the drawings

FIG. 4 shows a sectioned side elevation view of the support mechanism as seen in the direction of section plane A-A in FIG. 3, and FIG. 5 shows a sectioned side elevation view of the support mechanism as seen in the direction of section plane B-B in FIG. 3.

DETAILED DESCRIPTION OF ILLUSTRATIVE EMBODIMENT OF THE INVENTION

Figure 1:
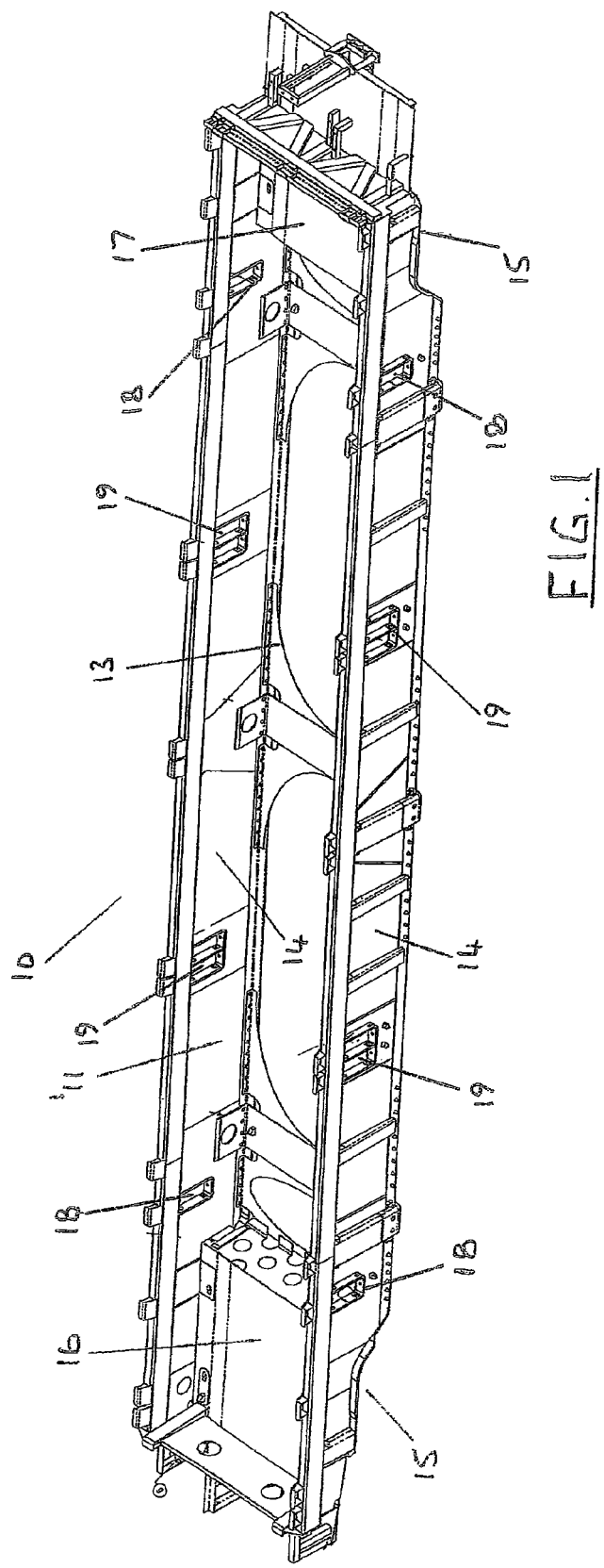
FIG. 1 shows a perspective view of the skeletal body of a railway freight wagon including supports being an embodiment of the invention, the wagon being of a type that is arranged to carry shipping containers but with rail-engaging wheel assemblies being omitted from each end of the wagon.

The freight wagon 10 as illustrated in FIG. 1 has a substantially conventional construction and it may be varied in terms of its length and other constructional features to meet specific requirements. It is arranged to receive at least one shipping container (not shown), but more usually a plurality of shipping containers located in end-to-end relationship. The shipping containers may be located wholly within a well portion 11 of the wagon or be supported upon support mechanisms 12, one form of which is to be described with reference to FIGS. 2 to 5. FIG. 1 omits for clarity the support mechanisms which are mounted in association with openings 18 and 19.

The wagon 10 has a bottom wall 13, which is open over a major part of its area, side walls 14, and end regions 15 in which wheel assemblies (not shown) are located. Platforms 16 and 17 are located within opposite ends of the well portion 11 and comprise defining walls of the end regions 15. In order to maximise the carrying capacity of the wagon 10, shipping containers may be rested upon the platforms 16 and 17 and, between the platforms, be carried by the support mechanisms 12.

As illustrated, each of the side walls 14 is provided with four openings, two of which are single-width openings 18 and the other two of which are double-width openings 19. Each of the double width openings 19 is shaped and sized to receive a dual support mechanism 12 of the type shown in FIGS. 2 to 5, and each of the single width openings 18 is shaped and sized to receive a single support mechanism.

Figure 2:
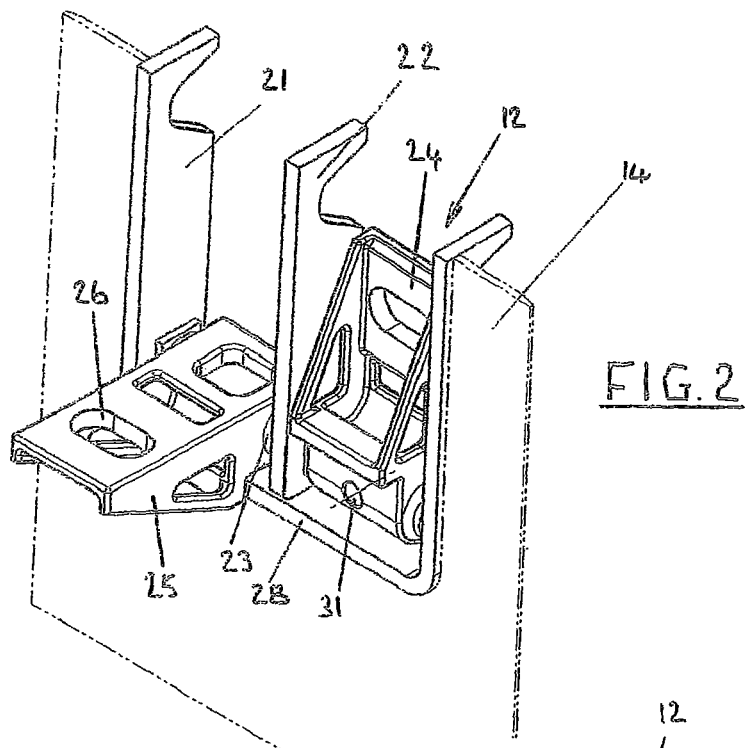
FIG. 2 shows a front perspective view of a dual support mechanism when removed from the wagon of FIG. 1 but with a wall portion of the wagon shown in chain-dotted outline.
Figure 3:
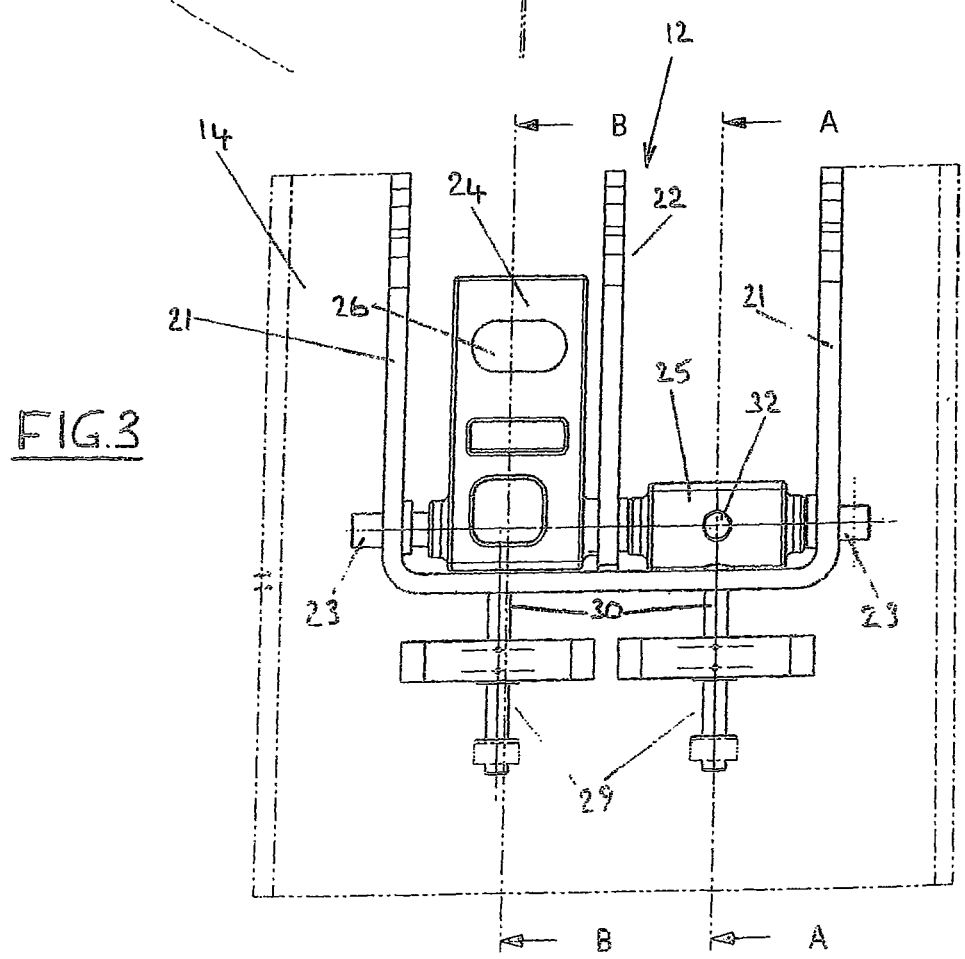
FIG. 3 shows a rear elevation view of the support mechanism as illustrated in FIG. 2.

The single support mechanism is not illustrated as such but it does effectively comprise one half of the mechanism 12 as shown in FIGS. 2 to 5. Thus, each single support mechanism comprises a single support arm 24 or 25 rather than the two support arms as shown in FIGS. 2 and 3.

The support mechanism 12 as shown in FIGS. 2 to 5 comprises a generally U-shaped frame structure 21 and, as an integral portion of the structure 21, a central frame member 22. The support mechanism is located within and is secured in the wall opening 19 in a manner such that it projects into the container well to a minimum extent, so as to not intrude significantly into the space to be occupied by a shipping container.

A pivot axle 23 is carried by the frame structure 21/22 and is disposed to extend substantially horizontally when the support mechanism 12 is, in use, positioned within the side wall 14 of the freight wagon. Two support arms 24 and 25 are pivotally mounted to the axle and both are pivotal between a first position, in which they are stowed at least in part (and desirably wholly) within the frame structure and a second position in which they extend outwardly from the frame structure in a substantially horizontal direction to enter the well portion 11 of the freight car at substantially the same level as that of the platforms 16 and 17. FIGS. 2,3 and 5 show the support arm 24 in the first position and FIGS. 2,3 and 4 show the support arm 25 in the second position.

The support arms 24 and 25 are, when required, moved manually between the first and second positions by personnel located outside of the freight wagon. Also, the support arms are sized and shaped to support shipping containers when they are located within the freight car 10 at the level of the platforms 16 and 17. Apertures 26 are provided in the support arms 24 and 25 for receiving twist-lock mechanisms (not shown) that conventionally are associated with shipping containers.

Each of the support arms 24 and 25 is formed integrally with an abutment face 27 that is arranged and positioned to engage with a lower, horizontal bridging portion 28 of the frame structure when the support arm is located in the second position, as indicated in FIGS. 2 and 4. Thus, engagement between the abutment face 27 of the support arm and the frame structure 21 provides for referral from the support arm 24 to the frame structure, and thence to the wall 14 of the wagon, of a force exerted on the support arm by a container carried by the support arm.

A retractable latching mechanism 29 is employed to latch the support arms 24 and 25 in each of the first and the second positions. The latching mechanism is located on the outside of the wagon wall 14 and comprises a spring-loaded plunger 30 that is engaged in respective ones of two recesses 31 and 32 in the support arms when the support arms are alternatively in the first and second positions.

The invention claimed is:

1. A support mechanism for mounting in a side wall of a railway freight wagon and for supporting a shipping container on the railway freight wagon when the support mechanism is deployed for use, the support mechanism comprising:
   a frame structure, arranged to be mounted in a side wall of the railway freight wagon; and
   at least one support arm pivotally mounted on the frame structure for movement about a substantially horizontal axis, the at least one support arm being arranged to pivot between a first position in which it is stowed at least in part within the frame structure and a second position in which it extends away from the frame structure in a substantially horizontal direction so it is deployed as a cantilever structure to support the vertical load of one side of the shipping container and to maintain the shipping container at an elevated position relative to a floor of the railway freight wagon,
   wherein the frame structure includes a horizontal bridging portion that extends from the frame structure and that directly contacts the at least one support arm, when the at least one support arm is in the second position, to prevent the at least one support arm from pivoting past the substantially horizontal direction.

2. A support mechanism as claimed in claim 1, wherein the frame structure further includes first and second spaced walls adapted to be fixed in the side wall and substantially within the thickness of the side wall, and an axle extending between the first and second spaced walls providing pivotal mounting for a corresponding portion of the at least one support arm.

3. A support mechanism as claimed in claim 2, wherein the at least one support arm comprises a base portion extending substantially the full width of the at least one support arm and having a bore for pivotally mounting the at least one support arm on an axle, a projecting main wall one surface of which defines a substantially planar surface for engaging and supporting the shipping container when deployed, a transverse wall extending from the base wall and providing a shoulder with an abutment surface for abutting an upper surface of the frame structure for support purposes when deployed, and lateral flanges extending between the transverse wall and sides of the projecting main wall.

4. A support mechanism as claimed in claim 2, wherein the first and second spaced walls are interconnected by a base wall to provide a generally u-shaped structure.

5. A support mechanism as claimed in claim 4, wherein the at least one support arm has a central plate like body having a support surface which is adapted to engage and support the shipping container when deployed and side flanges extending substantially at right angles to the support surface and in an end region providing engagement apertures for pivotally interengaging the axle.

6. A support mechanism as claimed in claim 5, wherein each of the side flanges has an outer projecting portion defining at its end nearer the axle a shoulder adapted to engage and be supported on the base wall when the at least one support arm is deployed into the second position.

7. A support mechanism as claimed in claim 1, further comprising a latch adapted to be mounted on the side wall of the railway freight wagon and engagable with the at least one support arm to latch and secure the at least one support arm in at least the first position.

8. A support mechanism as claimed in claim 1, wherein two support arms are provided in the support mechanism, the frame structure providing spaced first, second and third walls defining spaces for receiving the first of the two support arms between the first and second walls and the second of the two support arms between the second and third walls, pivotal mounting being provided on an axle passing through respective apertures in base portions of the two support arms.

9. A railway freight wagon for carrying shipping containers, the railway freight wagon comprising:
   side walls; and
   a plurality of support mechanisms disposed at locations in the side walls so that selective deployment of support arms of the support mechanisms provides for support of the shipping containers,
   wherein each of the support mechanisms includes:
      a frame structure, mounted in one of the side walls of the railway freight wagon, and
      at least one support arm pivotally mounted on the frame structure for movement about a substantially horizontal axis, the at least one support arm being arranged to pivot between a first position in which it is stowed at least in part within the frame structure and a second position in which it extends away from the frame structure in a substantially horizontal direction so it is deployed as a cantilever structure to support the vertical load of one side of one of the shipping containers and to maintain the one of the shipping containers at an elevated position relative to a floor of the railway freight wagon, and
   wherein the frame structure includes a horizontal bridging portion that extends from the frame structure and that directly contacts the at least one support arm, when the at least one support arm is in the second position, to prevent the at least one support arm from pivoting past the substantially horizontal direction.

10. A railway freight wagon as claimed in claim 9, wherein the central region of the railway freight wagon has a well defined between one of the side walls and having a base wall for supporting one of the shipping containers of a length less than the length of the well and the railway freight wagon having platforms defined at each end of the well and above a zone containing wheels, each of the platforms being adapted to receive and support the end of one of the shipping containers whereby when the support mechanisms are in their respective first positions one of the shipping containers is configured to be located and supported in the well but when the support mechanisms are deployed to the second positions, the railway freight wagon is configured to have one of the shipping containers having an end portion supported on a platform and an opposite end portion supported on a centrally located one of the support mechanisms.

11. A railway freight wagon as claimed in claim 9, wherein the frame structure has first and second spaced walls adapted to be fixed in one of the side walls and substantially within the thickness of the one of the side walls, and an axle extending between the first and second spaced walls providing the pivotal mounting for a corresponding portion of the at least one support arm.

12. A railway freight wagon as claimed in claim 11, wherein the at least one support arm comprises a base portion extending substantially the full width of the at least one support arm and having a bore for pivotally mounting the at least one support arm on an axle, a projecting main wall one surface of which defines a substantially planar surface for engaging and supporting one of the shipping containers when deployed, a transverse wall extending from the base wall and providing a shoulder with an abutment surface for abutting an upper surface of the frame structure for support purposes when deployed, and lateral flanges extending between the transverse wall and sides of the projecting main wall.

13. A railway freight wagon as claimed in claim 11, wherein the first and second spaced walls are interconnected by a base wall to provide a generally u-shaped structure.

14. A railway freight wagon as claimed in claim 13, wherein the at least one support arm has a central plate like body having a support surface which is adapted to engage and support one of the shipping containers when deployed and side flanges extending substantially at right angles to the support surface and in an end region providing engagement apertures for pivotally interengaging the axle.

15. A railway freight wagon as claimed in claim 14, wherein each of the side flanges has an outer projecting portion defining at its end nearer the axle a shoulder adapted to engage and be supported on the base wall when the at least one support arm is deployed into the second position.

16. A railway freight wagon as claimed in claim 9, further comprising a latch adapted to be mounted on one of the side walls of the railway freight wagon and engagable with the at least one support arm to latch and secure the at least one support arm in at least the first position.

17. A railway freight wagon as claimed in claim 9, wherein two support arms are provided in the support mechanism, the frame structure providing spaced first, second and third walls defining spaces for receiving the first of the two support arms between the first and second walls and the second of the two support arms between the second and third walls, pivotal mounting being provided on an axle passing through respective apertures in base portions of the two support arms.

* * * * *